Oct. 8, 1963    A. J. WESOLOWSKI    3,106,654
SALIENT POLE FOR SYNCHRONOUS MACHINES
Filed June 23, 1959
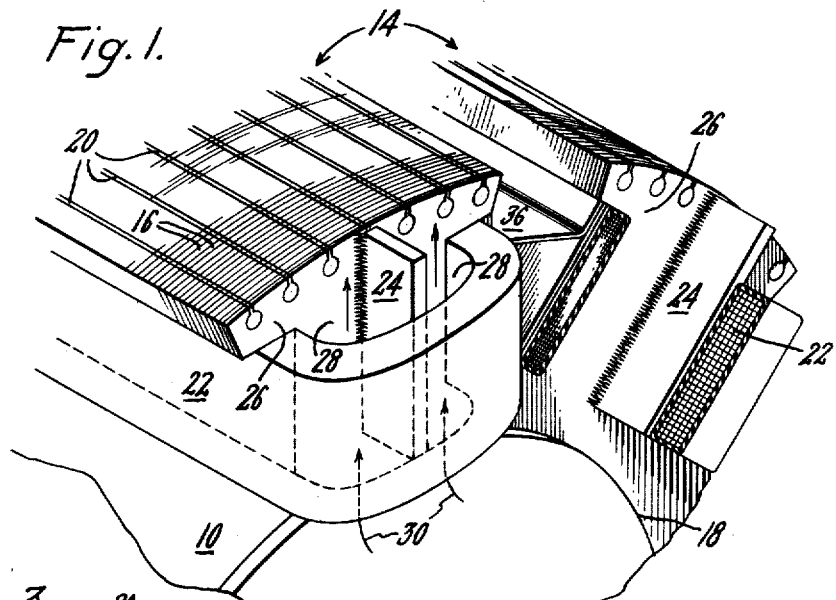
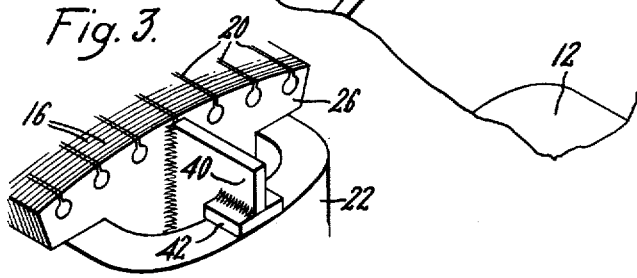
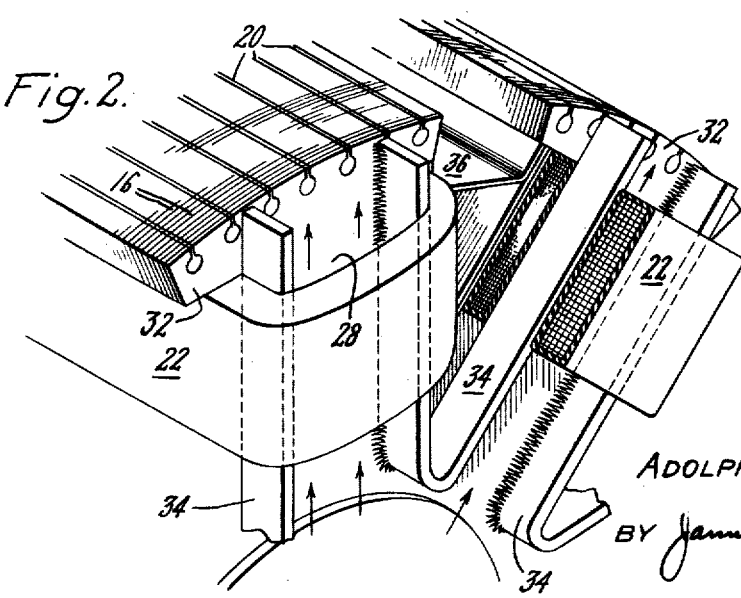
INVENTOR
ADOLPH J. WESOLOWSKI
BY James R. Campbell
HIS ATTORNEY

United States Patent Office 3,106,654
Patented Oct. 8, 1963

3,106,654
SALIENT POLE FOR SYNCHRONOUS MACHINES
Adolph J. Wesolowski, Erie, Pa., assignor to General
Electric Company, a corporation of New York
Filed June 23, 1959, Ser. No. 822,365
5 Claims. (Cl. 310—61)

The invention described herein relates to synchronous machines and more particularly to an improved salient pole construction for facilitating dissipation of heat from the rotor windings and pole bodies.

Demands by users for reduction in the size and weight and increase in power output to provide improved performance of this type machine has created problems connected with the dissipation of heat from the winding and the poles positioned on the rotor surface. Various arrangements have been employed for diverting air across and through the rotor but in the usual situation, the rotor winding for each pole is in such close contact with the iron of the pole that optimum heat transfer cannot be accomplished. The exposed portions of the winding are adequately cooled, but depending on the design and use of the machine, temperature gradients extend either toward or away from the pole, and in those cases where the iron core operates at a higher temperature than the winding, the problem of heat dissipation becomes even more severe.

In order to overcome these problems, flat plates, U-shaped fan blades, straps and other air circulating devices have been attached to the poles for carrying away heat from the rotor by convection. These air moving devices may be useful with machines of particular design but they usually create additional problems, such as mechanical unbalance in the construction, so that any cooling benefit gained is sometimes outweighed by the decrease in performance and added maintenance. In those machines where air deflectors are not used, the coil end turns are shaped to a configuration which will cause circulation of air past the windings and the iron of the salient pole for effecting transfer of heat to the atmosphere. This construction has proven effective, particularly in 14 pole machines for example, since adequate ventilation is provided for cooling the heated parts.

A practical manufacturing problem encountered in the construction of salient pole rotors for small machines is that after the wire is wound on a pole body, a certain amount of axial looseness exists between the winding and the pole such that the winding must be blocked to prevent its subsequent displacement when the machine is placed in operation. To avoid doing so, creates both a mechanical and electrical unbalance which is detrimental to the performance of the machine.

The requirements for greater power output coupled with a more economical construction therefore dictates the need for an improved design of synchronous machine rotor wherein the machine rating can be increased substantially while still staying within the allowable operating temperatures established by NEMA and other standards and specifications.

It therefore is an object of my invention to provide an improved salient pole construction of economical design wherein the inner surfaces of the winding end turns on each pole are cooled to a sufficient degree to permit improvement in the heat dissipating capabilities.

Another object of my invention is to provide a salient pole construction wherein the windings are accurately positioned on the pole body during the manufacturing process, thereby eliminating the need for thereafter making adjustments to account for mechanical and electrical unbalance in the rotor.

In carrying out the above objects of my invention, I provide a salient pole for a rotor wherein a combined fan blade and spacer is disposed radially on the outermost lamination provided on each side of the punching stack. A winding comprising a plurality of turns of wire is then wound around the pole body and the combined fan blade and spacer on opposite ends thereof to provide a construction capable of passing air in heat exchange relationship with both the inner surfaces of the winding end turns and the iron on the ends of the salient pole. The fan blade and spacer is further effective in accurately locating the winding on the pole body since the desired degree of tension can be imparted to each turn for minimizing subsequent winding displacement and achieving optimum mechanical and electrical balance in the rotor. In a modification, a plurality of such combined fan blades and spacers may be associated with the end laminations according to the operating temperature characteristics and manufacturing cost requirements for a particular salient pole construction.

While the specification concludes with claims particularly pointing out and distinctly claiming the subject matter which I regard as my invention, it is believed the invention will be better understood from the following description taken in connection with the accompanying drawing in which:

FIGURE 1 is a perspective view of a portion of a salient pole mounted on the peripheral surface of a rotor;

FIGURE 2 is a modification illustrating the use of a plurality of combined fan blade and spacer assemblies used for spacing a winding from the pole body; and FIGURE 3 illustrates an extension on a combined fan blade and spacer for holding the winding end turns against displacement when subjected to centrifugal forces.

Referring now to the drawings wherein like reference characters designate like or corresponding parts throughout the several views, there is shown in FIGURE 1, a rotor 10 comprising a shaft 12 having a salient pole 14 disposed on its outer peripheral surface. Conventionally, each pole comprises a plurality of laminations 16 secured to the shaft through an intermediate member 18 and slots 20 are provided for receiving amortisseur bars in the usual manner. A winding 22 completes the salient pole structure.

During operation of a synchronous machine, both the pole and amortisseur windings contribute to the total heat generated although in most instances higher temperatures prevail in the pole winding. Heat therefore flows by conduction to the iron core even though a major portion is radiated into the space between adjacent poles where it is removed by air circulated through the machine in a predetermined pattern. Much of the pole winding heat is also dissipated by the end turns. When the pole winding is located closely to or in intimate contact with the core, the heat therein cannot readily be removed and the operating temperature rise thus resulting, places limits on the rating applicable to the machine. It is advantageous from a performance standpoint to provide additional avenues for dissipation of the core heat and I accomplish this by providing a combined fan blade and spacer 24 preferably formed as a part of the last laminations 26 in the punching stack. The winding 22 is then wound around the pole and the fan blade and spacer 24, and drawn tightly thereon to provide a space 28 between the inner surface of the winding and the exposed surfaces of the last or end laminations in the stack. The fan blade and spacer may be welded or otherwise attached to the end punching or when the end punching consists of a copper plate, then both the amortisseur bars and fan blade and spacer may be brazed to it.

In operation, heat is generated in the field pole and amortisseur windings and flows respectively toward the winding end turns and the combined fan blade and spacer 24. Circumferential movement of the poles causes the relatively sharp bottom portions of the windings and the fan blade and spacer to cut air and circulate it outwardly through the passages 28 provided between the inner surfaces of the winding and lamination 26 on the poles. In doing so, the air not only carries away heat radiated into the passages 28 but also performs a scrubbing action on the inner surfaces of the winding and the exposed surface of the lamination 26 with its attached fan blade and spacer. Since the upper portion of the fan blade and spacer is in direct contact with that area of the laminations enclosing the amortisseur bars, heat is conducted readily to it thereby permitting heat removal more expeditiously than otherwise would be the case. This is particularly important where the machine would be operated under unbalanced loads. Continued air flow across these surfaces of large area establishes a relatively large temperature gradient in both the winding and core such that a more rapid flow of heat takes place toward the zones of reduced temperature. Cooling in this manner is in addition to that normally obtained from passing air in contact with the sides of the winding and that portion of the pole body enclosing the amortisseur bars. This construction effectively permits operation of the machine at a much lower temperature which makes possible applying a larger rating than otherwise would be possible.

When the turns of wire comprising the winding are wound or otherwise placed in position on conventional salient poles, an axial distance between the winding inner surfaces and ends of the pole body sometimes exists so that spacers must be used in locating the winding snugly and accurately in position. If some type of blocking means is not resorted to, both a mechanical and electrical unbalance will exist in the machine. By utilizing the teachings of this invention, the combined fan blade and spacer eliminates the disadvantages associated with aligning the winding on the pole body because the wire can be wound under tension, thus making it adhere closely to the pole. The fan blade and spacer accurately positions the winding on the pole and the efforts previously needed for locating it in position need not be made.

As indicated previously, circulating currents in the iron generate heat in addition to that normally transmitted thereto by the winding. In some instances, particularly when the machine is supplying power to a single phase load, hystereses and eddy current losses cause the pole to operate at a higher temperature than the winding. The cooling problems are more severe in those cases because a major portion of the pole is enclosed by the winding which also operates at an elevated temperature.

FIGURE 2 illustrates a construction especially useful in machines wherein the poles are operated at a higher temperature than the windings. In this modification, an aluminum plate 32 shaped to substantially the same configuration as the salient pole punchings is cast integral with the amortisseur bars in each pole. In other constructions, all of the amortisseur windings and end plates 32 are cast simultaneously or independently according to the construction used. Obviously, separate round bars for the amortisseur slots with attached end rings may be used as in a conventional manner. Since the outer portions of the pole body are used for supporting a mold during casting, the aluminum plates are somewhat smaller in size than the laminations but may be thicker. V-shaped bars or fan blades and spacers 34 are either cast integrally with the winding and end plates or they may be separately brazed or otherwise attached to the exposed surface of plate 32 in the manner illustrated in FIGURE 2. As shown, these bars 34 are located adjacent the ends of the plate 32 such that when the winding 26 is wound on the pole body, it is caused to extend a short distance axially therefrom to provide a space or air passage 28 of a depth corresponding to the depth of the bars 34. In addition to serving as a fan blade and spacer, the bars 34 also serve to close the circuit between poles for the quadrature axis component of current in the amortisseur winding. Since the ends of the bars are reversely bent to provide the V-shape construction shown, their lower ends extend into an air stream and therefore serve as a fan blade for forcing air through passage 28 between the end of the pole body and the winding 22. As in the previous modification, this action serves to scrub the inner surface of winding 22 and the exposed surface of aluminum plate 32 thereby to provide an effective means for carrying away heat radiated into the air passages.

In this modification, the heat flow path is in a reverse direction with respect to the winding because heat is conducted to the area of lower temperature. Nevertheless a parallel flow path exists from the iron core to the sides of the winding and then to the winding end turns where it is removed by radiation and convection. Heat also flows directly to the aluminum plate 32 from the core where the air likewise performs a similar function.

It will be seen that in both of these modifications a separation plate 36 is located between each adjacent salient pole in order to cause air to travel axially thereof and carry away heat dissipated outwardly from the sides of the poles and the windings. Depending on the size and use of the machine, the separation plate 36 may be V-shape in cross section such that its ends are located beneath the projecting portions of the pole and its bottom surfaces hold the random windings on adjacent poles in position.

In the modification shown in FIGURE 3, the fan blade and spacer are equipped with an extension 40 which overlies the end turns for preventing their displacement when acted on by centrifugal forces. Preferably, a plate 42 is attached to the underside of the extension to provide a greater contact surface area. Obviously plates may be added to bars 34 in like manner. It will be evident that in lieu of providing an extension integral with the fan blade, a separate T-shaped element could be used for example, where one leg of the T would be bolted or otherwise secured to the fan blade, while the other portion of the T would overlie the field winding for preventing end turn displacement when the rotor is operated.

It will be evident that the plate 32 may comprise any metallic or other material which is capable of transmitting heat from the higher to lower temperature zones existing in the pole body. The bars 34 may be welded, brazed, or otherwise affixed to the plate 32 or they may be cast integral therewith particularly when this kind of construction is used with relatively small machines where accuracy in dimensions can readily be established. It is not absolutely essential that the bars 34 be located on the ends of the plates 32 but may be moved inwardly a distance to provide a plurality of air passages 28. Other modifications will be readily apparent to those skilled in the art as for example, the bars 34 may be perforated along their length to permit air to travel from one passage to another and they also may conveniently terminate in an L-shaped member near the top of the pole wherein the base of the L would overlie the winding thereby to provide a construction effective in resisting outward displacement of the winding end turns when subjected to centrifugal forces encountered during rotation. Likewise, these portions of the V-shaped bars close to the shaft may be shaped to permit scooping of air and thus provide a more positive circulation through the passages 28.

Although straight bars attached or integrally formed with the end punchings or plates have been disclosed, other modifications may occur to specialists in this field.

In view of the above, it will be evident that many modifications and variations are possible in light of the above teachings. It therefore is to be understood that within the scope of the appended claims the invention may be practiced otherwise than as specifically described.

What I claim as new and desire to secure by Letters Patent of the United States is:

1. A rotor comprising a shaft having a plurality of salient poles disposed around its peripheral surface, each of said poles comprising a laminated core equipped with an amortisseur winding in its outer surface and a field winding wound around the core, a combined fan blade and spacer device positioned on opposite ends of each pole and located between the laminated core and the inner surface of the field winding, each of said devices having one side attached to the exposed surface of the laminated core and the other side in engagement with the field winding, an air passage formed between the core and winding by the boundaries of each side of the fan blade and spacer device and the exposed winding and core surfaces adjacent thereto for permitting air to travel therethrough during machine operation and thereby carry away heat dissipated outwardly by the core and winding.

2. The combination according to claim 1 wherein an extension is provided on each fan blade and device and arranged to overlie said winding and thereby prevent its radial displacement during rotor operation.

3. A rotor comprising a shaft having a plurality of salient poles disposed around its peripheral surface, each of said poles comprising a laminated core equipped with an amortisseur winding in its outer surface and a field winding wound around the core body, a pair of combined fan blade and spacer devices attached to a punching on each end of said core and positioned between the end turns of said field winding and the core body, each of said fan blade and spacer devices comprising a bar of generally rectangular configuration extending axially outward from said punchings a distance sufficient to space said winding from the ends of the core body, at least one air passage between the ends of the core and the end turns of the winding for causing air to be circulated through the passages and thereby cool the inner surfaces of the winding and the exposed surfaces of the ends of the core.

4. The combination according to claim 3 wherein said spacer means comprises a V-shaped bar having the legs thereof respectively attached to the ends of adjacent laminated cores disposed on the rotor surface, said V-shaped bar being effective in spacing the winding end turns from the core ends and in causing air to be circulated through an air passage therebetween for carrying away heat dissipated by the core and windings during machine operation.

5. The combination according to claim 4 wherein the amortisseur bars, end plates and V-shaped bars are cast integrally on each of said salient poles.

References Cited in the file of this patent

UNITED STATES PATENTS

| | | |
|---|---|---|
| 821,249 | Lundell | May 22, 1906 |
| 2,864,014 | Schmitt | Dec. 9, 1958 |

UNITED STATES PATENT OFFICE
CERTIFICATE OF CORRECTION

Patent No. 3,106,654                      October 8, 1963

Adolph J. Wesolowski

It is hereby certified that error appears in the above numbered patent requiring correction and that the said Letters Patent should read as corrected below.

Column 5, line 18, after "and", first occurrence, insert -- spacer --.

Signed and sealed this 7th day of July 1964.

(SEAL)
Attest:

ERNEST W. SWIDER
Attesting Officer

EDWARD J. BRENNER
Commissioner of Patents